United States Patent
Shimura et al.

(10) Patent No.: US 11,904,600 B2
(45) Date of Patent: Feb. 20, 2024

(54) PRINTING METHOD AND PRINTING DEVICE

(71) Applicants: Naoto Shimura, Tokyo (JP); Yuya Hirokawa, Kanagawa (JP); Yuusuke Koizuka, Shizuoka (JP); Takayuki Shimizu, Kanagawa (JP); Itsuro Sasaki, Kanagawa (JP); Shunsuke Horie, Kanagawa (JP); Nozomi Terai, Tokyo (JP); Kenta Hagiwara, Tokyo (JP)

(72) Inventors: Naoto Shimura, Tokyo (JP); Yuya Hirokawa, Kanagawa (JP); Yuusuke Koizuka, Shizuoka (JP); Takayuki Shimizu, Kanagawa (JP); Itsuro Sasaki, Kanagawa (JP); Shunsuke Horie, Kanagawa (JP); Nozomi Terai, Tokyo (JP); Kenta Hagiwara, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 170 days.

(21) Appl. No.: 17/706,589

(22) Filed: Mar. 29, 2022

(65) Prior Publication Data
US 2022/0324241 A1     Oct. 13, 2022

(30) Foreign Application Priority Data

Mar. 31, 2021 (JP) .................. 2021-060995
Aug. 25, 2021 (JP) .................. 2021-137317

(51) Int. Cl.
*B41J 11/00* (2006.01)
*B41M 5/00* (2006.01)

(52) U.S. Cl.
CPC ...... *B41J 11/00216* (2021.01); *B41M 5/0023* (2013.01)

(58) Field of Classification Search
CPC ............ B41J 11/00244; B41J 11/00216; B41J 2/1433; B41M 5/0023; C09D 11/40;
(Continued)

(56) References Cited

U.S. PATENT DOCUMENTS

| 2008/0043080 A1* | 2/2008 | Isobe ...................... C09D 11/38 |
| | | 106/31.89 |
| 2018/0086067 A1* | 3/2018 | Mizutani .............. B41J 2/14088 |

(Continued)

FOREIGN PATENT DOCUMENTS

| CN | 1630757 A | 6/2005 |
| CN | 1981003 A | 6/2007 |

(Continued)

OTHER PUBLICATIONS

Office Action dated May 24, 2023 in Chinese Patent Application No. 202210298531.8, 7 pages.
(Continued)

*Primary Examiner* — Jason S Uhlenhake
(74) *Attorney, Agent, or Firm* — XSENSUS LLP

(57) ABSTRACT

A printing method includes discharging ink to a substrate, heating a non-ink-discharged side of the substrate at T1, and heating an ink-discharged side of the substrate at T2, wherein the ink contains an organic solvent A (boiling point lower than 250 degrees C.), an organic solvent B (boiling point of 250 degrees C.), and a resin, where 0 degrees C. ≤T2−T1≤90 degrees C. is satisfied, the proportion (organic solvent A/ink) is 30 percent by mass or less, the proportion (organic solvent B/ink) is 1 to 3 percent by mass, the proportion (resin/ink) is 5 to 15 percent by mass, the ink has a viscosity of 8.0 to 11.0 mPa-s at 25 degrees C. and 5.5 to 11.0 mPa-s at 36 degrees C., and a 2.5 μL ink droplet discharged to the substrate shrinks to 0.1 μL within 10.0 seconds at 25 degrees C.

12 Claims, 2 Drawing Sheets

(58) Field of Classification Search
CPC ... C09D 11/033; C09D 11/037; C09D 11/104; C09D 11/322
See application file for complete search history.

(56) References Cited

U.S. PATENT DOCUMENTS

| | | | |
|---|---|---|---|
| 2018/0208783 | A1 | 7/2018 | Takahashi et al. |
| 2019/0270900 | A1 | 9/2019 | Nakamura et al. |
| 2019/0283406 | A1 | 9/2019 | Fujita et al. |
| 2019/0284419 | A1 | 9/2019 | Kobashi et al. |
| 2020/0102467 | A1 | 4/2020 | Nakamura et al. |
| 2020/0171839 | A1* | 6/2020 | Takahashi ............ B41J 2/17523 |
| 2020/0299531 | A1 | 9/2020 | Nakamura et al. |
| 2021/0062026 | A1 | 3/2021 | Shimura et al. |
| 2022/0024217 | A1 | 1/2022 | Sakaguchi et al. |

FOREIGN PATENT DOCUMENTS

| | | | |
|---|---|---|---|
| CN | 101617003 | A | 12/2009 |
| CN | 101672940 | A | 3/2010 |
| CN | 102046737 | A | 5/2011 |
| CN | 104708931 | A | 6/2015 |
| CN | 104870577 | A | 8/2015 |
| CN | 104968500 | A | 10/2015 |
| CN | 107266976 | A | 10/2017 |
| CN | 107709026 | A | 2/2018 |
| CN | 107880649 | A | 4/2018 |
| CN | 108698420 | A | 10/2018 |
| CN | 109572203 | A | 4/2019 |
| CN | 112123962 | A | 12/2020 |
| JP | 2005-144966 | | 6/2005 |
| JP | 2017-105193 | | 6/2017 |
| JP | 2019-163380 | | 9/2019 |
| JP | 2020-125469 | | 8/2020 |

OTHER PUBLICATIONS

U.S. Appl. No. 17/450,304, filed Oct. 8, 2021, Tatsuya Takarada, et al.

U.S. Appl. No. 17/482,556, filed Sep. 23, 2021, Yuusuke Koizuka, et al.

* cited by examiner

PRINTING METHOD AND PRINTING DEVICE

CROSS-REFERENCE TO RELATED APPLICATIONS

This patent application is based on and claims priority pursuant to 35 U.S.C. § 119 to Japanese Patent Application Nos. 2021-060995 and 2021-137317, filed on Mar. 31, 2021, and Aug. 25, 2021, respectively, in the Japan Patent Office, the entire disclosures of which are hereby incorporated by reference herein.

BACKGROUND

Technical Field

The present disclosure relates to a printing method and a printing device.

Description of the Related Art

Inkjet printing is now popular for readily producing color images with low running cost. In addition to paper such as plain paper and glossy paper, substrates for use in printing include fabric and cloth made of fiber such as knit fabric, woven fabric, and non-woven fabric, most of which are permeative. Printing on such a permeative substrate results in poor coloring because the coloring material in ink permeates inside the substrate.

One way of enhancing the coloring of a permeative substrate is to use sticky ink.

SUMMARY

According to embodiments of the present disclosure, a printing method is provided which includes discharging ink to a substrate, heating a non-ink-discharged side of the substrate at a temperature of T1, and heating an ink-discharged side of the substrate at a temperature of T2, wherein the ink contains an organic solvent A having a boiling point of lower than 250 degrees C., an organic solvent B having a boiling point of 250 degrees C. or higher; and a resin, wherein the following relationship (1) is satisfied: 0 degrees C.$\leq$T2−T1$\leq$90 degrees C. Relationship (1), wherein the proportion of the organic solvent A to the ink is 30 percent by mass or less, wherein the proportion of the organic solvent B to the ink is from 1 to 3 percent by mass, wherein the proportion of the resin to the ink is from 5 to 15 percent by mass, wherein the ink has a viscosity of from 8.0 to 11.0 mPa·s at 25 degrees C. and from 5.5 to 11.0 mPa·s at 36 degrees C., wherein a droplet of the ink having a volume of 2.5 µL discharged to the substrate shrinks to 0.1 µL or less in 10.0 seconds or less at 25 degrees C.

As another aspect of embodiments of the present disclosure, a printing device is provided which includes a container containing an ink, a discharging device for discharging the ink to a substrate, the discharging device including a nozzle having a discharging orifice at a nozzle surface, a first heating device for heating the non-ink-discharged side of the substrate at a temperature of T1, and a second heating device for heating the ink-discharged side of the substrate at a temperature of T2, wherein the following relationship (1) is satisfied; 0 degrees C.$\leq$T2−T1$\leq$90 degrees C. Relationship (1), wherein the ink contains an organic solvent A having a boiling point of lower than 250 degrees C., an organic solvent B having a boiling point of 250 degrees C. or higher, and a resin, wherein the proportion of the organic solvent A to the ink is 30 percent by mass or less, wherein the proportion of the organic solvent B to the ink is from 1 to 3 percent by mass, wherein the proportion of the resin to the ink is from 5 to 15 percent by mass, wherein the ink has a viscosity of from 8.0 to 11.0 mPa·s at 25 degrees C. and from 5.5 to 11.0 mPa·s at 36 degrees C., wherein a droplet of the ink having a volume of 2.5 µL discharged to the substrate shrinks to 0.1 µL or less in 10.0 seconds or less at 25 degrees C.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
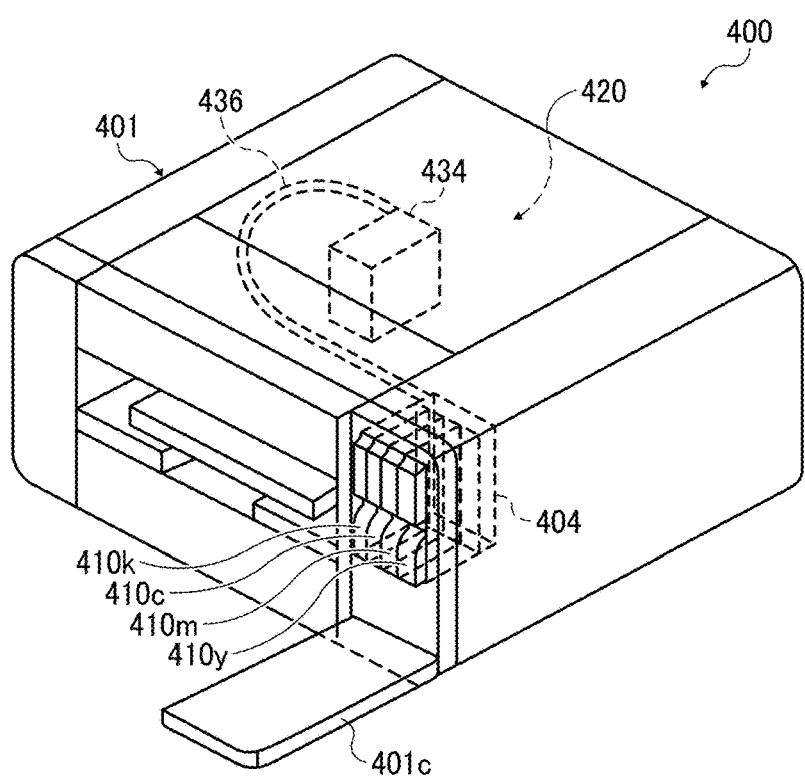
FIG. 1 is a schematic diagram illustrating a perspective view of an example of the printing device according to an embodiment of the present disclosure.

The accompanying drawings are intended to depict example embodiments of the present invention and should not be interpreted to limit the scope thereof. The accompanying drawings are not to be considered as drawn to scale unless explicitly noted.

Also, identical or similar reference numerals designate identical or similar components throughout the several views.

DESCRIPTION OF THE EMBODIMENTS

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to the present disclosure, a printing method is provided which maintains the image quality even on a permeative substrate with excellent discharging stability.

Printing Method

The printing method of the present disclosure includes discharging ink to a substrate, heating a non-ink-discharged side of the substrate at a temperature of T1 and heating an ink-discharged side of the substrate at a temperature of T2, wherein the following relationship (1) is satisfied:

$$0 \text{ degrees C.} \le T2-T1 \le 90 \text{ degrees C.} \quad \text{Relationship (1).}$$

The ink contains an organic solvent A having a boiling point of lower than 250 degrees C. an organic solvent B having a boiling point of 250 degrees C. or higher, and a resin. The proportion of the organic solvent A to the ink is 30 percent by mass or less. The proportion of the organic solvent B to the ink is from 1 to 3 percent by mass. The proportion of the resin to the ink is from 5 to 15 percent by mass. The ink has a viscosity of from 8.0 to 11.0 mPa-s at 25 degrees C. and from 5.5 to 11.0 mPa-s at 36 degrees C. A droplet of the ink having a volume of 2.5 µL discharged to the substrate shrinks to 0.1 µL or less on the substrate in 10.0 seconds or less at 25 degrees C.

Sticky ink for use in the method proposed in Unexamined Japanese Patent Application Publication No. 2005-144966 is likely to fixate on the nozzle surface of a discharging head, which degrades the discharging stability of ink and causes a problem of the ink applied to a substrate not drying soon. Since sticky ink tends to remain on a substrate, the abrasion resistance of the ink is weak.

The printing method of the present disclosure is to strike a balance between the image quality and discharging stability of ink for a permeative substrate not by a common ink and printing device but by the optimal combination of ink and system.

The printing method of the present disclosure includes: discharging ink to a substrate: heating the non-ink-discharged side of the substrate for drying the ink at a temperature of T1, which is referred to as first heating for convenience: heating the ink-discharged side of the substrate for drying the ink at a temperature of T2, which is referred to as second heating for convenience; and other optional steps.

T1 and T2 satisfy the following relationship (1).

$$0 \text{ degrees C.} \le T2-T1 \le 90 \text{ degrees C.} \quad (1)$$

The drying property of ink after the ink is discharged is excellent when T2−T1 is zero degrees C. or higher. The ink blurring after the ink is discharged is minimized, which leads to the enhancement of the image quality when T2−T1 is 90 degrees C. or lower.

Ink Discharging

In the printing method, a discharging device discharges ink to a substrate.

The discharging device is a nozzle having an orifice at the nozzle surface to discharge ink to a substrate. One example of the nozzle is a discharging head.

First Heating

In the first heating, a first heating device heats the non-ink-discharged side of the substrate to dry the ink at T1.

The heating temperature T1 in the first heating is preferably from 20 to 70 degrees C. A T1 of 20 degrees C. or higher enhances the drying property of ink discharged to a substrate. A T1 of 70 degrees C. or lower enhances the discharging stability of ink. In addition, the original texture of a substrate is maintained when the substrate is leather.

T1 represents the temperature of the first heating device.

The time length of heating by the first heating device is not particularly limited and can be suitably selected to suit to a particular application. It can be adjusted depending on the amount of ink discharged and the performance of a printing device.

The first heating device is not particularly limited as long as it can heat the non-ink-discharged side of a substrate and can be suitably selected to suit to a particular application. Examples of the first heating device is a heated wind heater and an infra-red heater.

The first heating is not particularly limited as long as it is executed before the second heating and can be suitably selected to suit to a particular application. The first heating can be executed with or after discharging ink.

Second Heating

The second heating device heats the ink-discharged side of the substrate mentioned above for drying the ink mentioned above.

The second heating device is not particularly limited as long as it can heat the ink-discharged side of a substrate and can be suitably selected to suit to a particular application. Examples of the second heating device is a heated wind heater and an infra-red heater.

T2 is not particularly limited as long as it satisfies the relationship (1) and can be suitably selected to suit to a particular application. It is preferably from 35 to 90 degrees C. T2 represents the temperature of the second heating device.

The heating time of the second heating device is preferably from 1 to 15 minutes. A heating time of 1 minute or more enhances the drying property. A heating time of 15 minutes or less maintains the original texture of a substrate when the substrate is leather.

Ink

The ink for use in the present disclosure contains an organic solvent A having a boiling point of lower than 250 degrees C., an organic solvent B having a boiling point of 250 degrees C. or higher, resin, and other optional components.

The ink has a viscosity of from 8.0 to 11.0 mPa-s at 25 degrees C. A viscosity of 8.0 mPa·s or greater minimizes the permeation of ink discharged onto a permeative substrate, which enhances the coloring of ink thereon. A viscosity of 11.0 mPa-s or less enhances the discharging stability. The ink preferably has a viscosity of from 9.0 to 11.0 mPa-s at 25 degrees C.

The ink has a viscosity of from 5.5 to 11.0 mPa-s at 36 degrees C. A viscosity of from 5.5 to 11.0 mPa-s minimizes the change in viscosity of the ink even when the temperature of the environment changes, which leads to enhancement of the discharging stability The ink preferably has a viscosity of from 6.5 to 11.0 mPa-s at 36 degrees C.

The method of measuring the viscosity mentioned above is not particularly limited and can be suitably selected to suit to a particular application. It is possible to use a rotatory viscometer (RE-80L, manufactured by TOKI SANGYO CO., LTD.) for measuring viscosity.

The conditions for measuring viscosity are as follows:
Standard cone rotor (1° 34'×R24)
Sample liquid amount: 1.2 mL
Rate of rotations: 50 rotations per minute (rpm)
25 degrees C.
Measuring time: three minutes.

The surface tension of ink is preferably 35 mN/m or less and more preferably 32 mN/m or less at 25 degrees C. because the ink suitably levels on a substrate so that the ink dries in a shorter time.

pH of the ink is preferably from 7 to 12 and more preferably from 8 to 11 to prevent the corrosion of metal material in contact with liquid.

Organic Solvent A

The organic solvent A is not particularly limited and can be suitably selected to suit to a particular application as long as its boiling point is lower than 250 degrees C. One example of the organic solvent A is a water-soluble organic solvent. The boiling point mentioned above means the initial boiling point at a reference pressure of 101.3 kPa.

Specific examples of the water-soluble organic solvent include, but are not limited to, polyols, polyol alkylethers, polyol arylethers, nitrogen-containing heterocyclic compounds, amides, amines, sulfur-containing compounds, propylene carbonates, and ethylene carbonates.

The polyol mentioned above is not particularly limited and can be suitably selected to suit to a particular application. Specific examples of the polyhydric alcohol include, but are not limited to, ethylene glycol, diethylene glycol, 1,2-propanediol, 1,3-propane diol, 1,2-butanediol, 1,3-butanediol, 1,4-butanediol, 2,3-butanediol, 3-methyl-1,3-butanediol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and petriol. Of these, 3-methyl-1,3-butanediol, 1,5-pentanediol, and 2,3-butanediol are preferable to enhance the discharging stability of ink.

Specific examples of the polyol alkylethers include, but are not limited to, ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

The polyol arylether mentioned above is not particularly limited and can be suitably selected to suit to a particular application.

Specific examples include, but are not limited to, ethylene glycol monophenylether and ethylene glycol monobenzylether.

The nitrogen-containing heterocyclic compound mentioned above is not particularly limited and can be suitably selected to suit to a particular application.

Specific examples include, but are not limited to, 2-pyrrolidone, N-methyl-2-pyrrolidone, N-hydroxyethyle-2-pyrrolidone, 1,3-dimethyl-2-imidazoline, ε-caprolactam, and γ-butylolactone.

The amide mentioned above is not particularly limited and can be suitably selected to suit to a particular application.

Specific examples include, but are not limited to, formamide, N-methyl formamide, N,N-dimethylformamide, 3-methoxy-N,N-dimethyl propionamide, and 3-buthoxy-N,N-dimethylpropionamide.

The amine mentioned above is not particularly limited and can be suitably selected to suit to a particular application.

Specific examples include, but are not limited to, monoethanol amine, triethanol amine and dietanol amine.

The sulfur-containing compound mentioned above is not particularly limited and can be suitably selected to suit to a particular application.

Specific examples include, but are not limited to, dimethylsulfoxide, sulfolane, and thiodietanol.

The proportion of the organic solvent A to the ink mentioned above is 30 percent by mass and preferably 25 percent by mass. A proportion of 30 percent by mass or less enhances the drying property of ink.

Organic Solvent B The organic solvent B is not particularly limited and can be suitably selected to suit to a particular application as long as it has a boiling point of 250 degrees C. or higher.

Specific examples include, but are not limited to, glycerin, boiling point of 290 degrees C., pentaerythritol, boiling point of 276 degrees C., triethylene glycol, boiling point of 285 degrees C., triethylene glycol monobutyl ether, boiling point of 278 degrees C., and tirpropylene glycol, boiling point of 273 degrees C. The boiling point mentioned above means the initial boiling point at a reference pressure of 101.3 kPa.

The ink containing an organic solvent B having a boiling point of 250 degrees C. or higher does not readily fixate around the nozzle surface, thereby achieving excellent discharging stability of ink.

The proportion of the organic solvent B to the ink mentioned above is from 1 to 3 percent by mass and preferably from 1.5 to 2.5 percent by mass. A proportion of the organic solvent B of 1 percent by mass or more prevents the ink from fixating around the norle surface, which leads to enhancement of the discharging stability of ink. A proportion of the organic solvent B of 3 percent by mass of less enhances the drying property of ink discharged onto a substrate.

Resin

The resin mentioned above is preferably in a form of aqueous resin particle to improve workability of preparation of ink or dispersibility thereof.

The type of the resin particle is not particularly limited and can be suitably selected to suit to a particular application. Examples include, but are not limited to, urethane resin particles, polyester resin particles, acrylic resin particles, vinyl acetate-based resin particles, styrene-based resin particles, butadiene-based resin particles, styrene-butadiene-based resin particles, vinylchloride-based resin particles, acrylic styrene-based resin particles, and acrylic silicone resin particles. These can be used alone or in combination. Of these, urethane resin particles are preferable to enhance the abrasion resistance of printed matter.

The urethane resin particle mentioned above is not particularly limited and can be suitably selected to suit to a particular application. Examples include, but are not limited to, a polycarbonate-based urethane resin particle, polyester-based urethane resin particle, and polyether-based resin particle. Of these, the polycarbonate-based urethane resin particle and polyester-based urethane resin particle are preferable. The polycarbonate-based urethane resin particle and polyester-based urethane resin particle preferably have a structure derived from alicyclic diisocyanate to achieve excellent abrasion resistance.

The polycarbonate-based urethane resin has excellent water resistance and abrasion resistance due to the strong aggregation derived from a carbonate group, which is suitable for preparing ink optimized for printed matter for use in a severe environment like outdoor.

The polyester-based urethane resin can readily introduce a rigid structure having an aromatic ring at a polyol site so that it has a high hardness, a high glass transition temperature, an excellent heat resistance, and an excellent abrasion resistance. The resin is suitable for preparing ink for printed matter for use in an environment readily under a burden such as abrasion.

It is possible to use synthetic or procurable resin particles as the resin particle.

Specific products of the resin particle include, but are not limited to, UCOAT UX-485, polycarbonate resin particle, UCOAT UWS-145, polyester-based urethane resin particle, PERMARIN UA-368T, polycarbonate urethane resin particle, PERMARIN UA-200, polycarbonate urethane resin particle, all manufactured by Sanyo Chemical Industries, Ltd., TAKELAC$^{trademark}$ WS4000, polycarbonate resin particle, TAKELAC$^{trademark}$ W6061, polycarbonate urethane resin particle, TAKELAC$^{trademark}$ W6601, polycarbonate urethane resin particle, all manufactured by Mitsui Chemicals, Inc., VONCOAT 5454, styrene-acrylic-based resin particle, manufactured by DIC Corporation. SAE-1014, styrene-acrylic-based resin particle, manufactured by Zeon Corporation, Saivinol SK-200, acrylic-based resin particle, manufactured by Saiden Chemical Industry Co., Ltd., PRIMAL$^{trademark}$ AC-22, AC-61, acrylic-based resin particle, all manufactured by Rohm and Haas, VONCOAT$^{trademark}$ 4001, acrylic-based resin particle, manufactured by DIC Corporation, and NANOCRYL, acrylic-based resin particle, manufactured by TOYOCHEM CO., LTD These can be used alone or in combination.

Dispersing resin particles of a forcible type in an aqueous medium using dispersant is allowed. However, resin particles of self-emulsification type are preferable because the anionic group in their molecular structure prevents the strength of coated film from decreasing caused by dispersant remaining in the coated film.

The acid value of the anionic group of the resin particle of self-emulsification type is preferably from 5 to 100 mgKOH/g and more preferably from 5 to 50 mgKOH/g to improve the water dispersibility, abrasion resistance, and chemical resistance.

The anionic group is not particularly limited and can be suitably selected to suit to a particular application. Specific examples include, but are not limited to, carboxylic group, carboxylate group, sulfonic acid group, and sulfonate group. Of these, a carboxylate or sulfonate group partially or entirely neutralized by a basic compound is preferable to maintain good water dispersion stability.

A water dispersion of resin particles having the anionic group is manufactured by adding a basic compound for neutralizing the anionic group to a water dispersion.

Specific examples of the basic compound include, but are not limited to, organic amines such as ammonium, triethyl amine, pyridine, and morpholine, alkanol amine such as monoethanol amine, and metal salt compounds containing metal such as Na, K, Li, and Ca. These can be used alone or in combination.

A surfactant such as a nonionic surfactant and an anionic surfactant is suitable for preparing a water dispersion using the resin particle of the forcible emulsification type. These can be used alone or in combination. Of these, nonionic surfactants are preferable in terms of water resistance.

Specific examples of the nonionic surfactants include, but are not limited to, polyoxyethylene alkyl ether, polyoxyethylene alkylene alkyl ether, polyoxyethylene derivatives, polyoxyethylene aliphatic acid esters, polyoxyethylene polyol aliphatic acid ester, polyoxyethylene propylene polyol, sorbitan aliphatic acid ester, polyoxyethylene curable ricinus, polyoxyalkylene polycyclic phenyl ether, polyoxyethylene alkyl amine, alkyl alkanol amide, and polyalkylene glycol (meth)acrylate. These can be used alone or in combination. Of these, polyoxyethylene alkylether, polyoxyethylene aliphatic acid esters, polyoxyethylene sorbitan aliphatic acid ester, and polyoxyethylene alkylamine are preferable.

Specific examples of the anionic surfactants include, but are not limited to, alkyl sulfuric acid ester salts, polyoxyethylene alkyl ether sulfuric acid salts, alkyl benzene sulfonic acid salts, α-olefine sulfonic acid salts, methyl lauryl acid salts, sulfosuccinic acid salts, ether sulfonic acid salts, ether carboxylic acid salts, aliphatic acid salts, naphthalene sulfonic acid formalin condensed compounds, alkyl amine salts, quaternary ammonium salts, alkyl betaine, and alkyl amine oxide. These can be used alone or in combination. Of these, polyoxyethylene alkylether sulfuric acid salts and sulfosuccinic salts are preferable.

The proportion of surfactant to the resin mentioned above is preferably from 0.1 to 30 percent by mass and more preferably from 5 to 20 percent by mass. A proportion of from 0.1 to 30 percent by mass forms resin film suitable for preparing ink having excellent attachability and water resistance, which prevents blocking of printed matter.

The volume average particle diameter of the resin particles mentioned above is not particularly limited and can be suitably selected for a particular application. It is preferably from 10 to 1,000 nm, more preferably from 10 to 200 nm, and particularly preferably from 10 to 100 nm for increasing the number of contact points of the surfaces between the resin particles and the organic solvent mentioned above, which attributes to forming a continuous robust resin film.

The volume average particle diameter is measurable by using, for example, a particle size analyzer, Microtrac MODEL UPA 9340, manufactured by Nikkiso Co., Ltd.

The proportion of the resin mentioned above to the ink mentioned above is from 5 to 15 percent by mass and preferably from 8 to 13 percent by mass. A proportion of 5 percent by mass or more makes ink sticky, which ameliorates the coloring and abrasion resistance of the ink applied even to a permeative substrate. A proportion of IS percent by mass or less prevents ink from fixating around the nozzle surface, which leads to the enhancement of the discharging stability of ink.

As the glass transition temperature (Tg) of the resin particle, 0 degrees C. or lower is preferable. The inclusion of at least one type of resin particle having a glass transition temperature of 0 degrees C. or lower enhances the filming property of ink on a substrate, resulting in improvement of the abrasion resistance.

The glass transition temperature of the resin particle is measurable by a method such as differential scanning calorimetry (DSC) and differential thermal analysis.

The proportion of the resin particle to the resin is preferably from 30 to less than 70 percent by mass and more preferably from 40 to 60 percent by mass. A proportion of 30 percent by mass or more improves the film forming of ink on a substrate, which toughens the ink film mentioned above, thereby enhancing the abrasion resistance of printed matter. A proportion of 70 percent by mass or less minimizes the film forming of ink at the nozzle surface of a discharging head, which secures the discharging reliability.

Coloring Material

The coloring material has no specific limit and is suitably selected for a particular application. For example, pigments and dyes are usable.

The pigment includes an inorganic pigment or organic pigment. These can be used alone or in combination. In addition, a mixed crystal can also be used as the coloring material.

Examples of the pigments include, but are not limited to, black pigments, yellow pigments, magenta pigments, cyan pigments, white pigments, green pigments, orange pigments, and gloss or metallic pigments of gold, silver, and others.

Carbon black manufactured by known methods such as contact methods, furnace methods, and thermal methods can be used as the inorganic pigment in addition to titanium oxide, iron oxide, calcium carbonate, barium sulfate, aluminum hydroxide, barium yellow, cadmium red, and chrome yellow.

Specific examples of the organic pigment include, but are not limited to, azo pigments, polycyclic pigments (e.g., phthalocyanine pigments, perylene pigments, perinone pigments, anthraquinone pigments, quinacridone pigments, dioxazine pigments, indigo pigments, thioindigo pigments, isoindolinone pigments, and quinophthalone pigments), dye chelates (e.g., basic dye type chelates and acid dye type chelates), nitro pigments, nitroso pigments, and aniline black. Of those pigments, pigments having good affinity with solvents are preferable.

Hollow resin particles and hollow inorganic particles can also be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51, C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177,178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38: C.I. Pigment Blue 1, 2, 15 (Phthalocyanine Blue), 15:1, 15:2, 15:3, 15:4, (Phthalocyanine Blue), 16, 17:1, 56, 60, and 63, C.I. Pigment Green 1, 4, 7, 8, 10, 17, 18, and 36.

The dye is not particularly limited and can be suitably selected for a particular application. It includes, for example, acidic dyes, direct dyes, reactive dyes, basic dyes.

These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material to the ink is preferably from 0.1 to 15 percent by mass and more preferably from 1 to 10 percent by mass to enhance the image density, fixability, and discharging stability.

Pigment-dispersed ink is obtained by, for example, preparing a self-dispersible pigment through an introduction of a hydrophilic functional group into pigment, coating pigment particles with resin followed by dispersion, or using dispersant for dispersing a pigment.

One way of preparing a self-dispersible pigment by introducing a hydrophilic functional group into a pigment is to add a functional group such as a sulfone group and carboxyl group to a pigment (e.g., carbon) to disperse the pigment in water.

One way of dispersing a pigment by coating the surface of the pigment with resin is to encapsulate pigment particles in microcapsules for dispersion in water. This can be referred to as a resin-coated pigment. The resin-coated pigment particles in ink are not necessarily entirely coated with resin.

The ink containing pigment particles not partially or wholly covered with resin is allowable unless such particles have an adverse impact. The resin-coated pigment is preferable to enhance the storage stability and discharging reliability of ink.

As the dispersant for use in the dispersion method described above, a known dispersant of a small or large molecular weight, typically a surfactant, is suitable.

The dispersant is not particularly limited and can be suitably selected for a particular application. Examples include, but are not limited to, an anionic surfactant, cationic surfactant, amphoteric surfactant, nonionic surfactant, and condensation product of naphtalene sulfonic acid Na formalin. Such dispersant can be used alone or in combination.

The nonionic surfactant is not particularly limited and can be suitably selected for a particular application. One example is RT-100, manufactured by TAKEMOTO OIL & FAT CO., LTD.

The pigment mentioned above can form a pigment dispersion when mixed with materials such as water and an organic solvent. The pigment dispersion obtained can make ink when mixed with materials such as water, an organic solvent, and dispersant.

The particle size of pigment dispersion is adjusted by mixing or dispersing with water, a pigment, a pigment dispersant, and other optional components.

The number average particle diameter of the pigment dispersion mentioned above is not particularly limited and can be suitably selected to suit to a particular application. It is preferably from 20 to 500 nm and more preferably from 20 to 150 nm to enhance the dispersion stability and image density and ameliorate the image density.

The particle diameter of the pigment is measurable using a particle size analyzer (Nanotrac Wave-UT151, manufactured by MicrotracBEL Corp).

The proportion of the pigment in the pigment dispersion is not particularly limited and can be suitably selected to suit a particular application. It is preferably from 0.1 to 50 percent by mass and more preferably from 0.1 to 30 percent by mass to enhance the discharging stability and image density.

It is preferable that the pigment dispersion be filtered with an instrument such as filter and a centrifuge to remove coarse particles followed by deaerating.

Other Optional Components

The other optional components are not particularly limited and can be suitably selected to suit to a particular application. Examples include, but are not limited to, silicone-based surfactants and additives.

Silicone-based Surfactant

The silicone-based surfactant is not particularly limited and can be suitably selected to suit to a particular application. Examples include, but are not limited to, side-chain modified polydimethylsiloxane, both-terminal modified polydimethylsiloxane, one terminal-modified polydimethyl siloxane, and side chain both terminal-modified polydimethylsiloxane.

The silicone-based surfactant includes, but is not limited to, polyether-modified silicone-based surfactant having a modification group such as a polyoxyethylene group and polyoxy ethylene polyoxy propylene group.

The polyether-modified silicone-based surfactant is not particularly limited and can be suitably selected to suit to a particular application. One example is polyxyalkylene-modified dimethyl polysiloxane represented by the following Chemical Formula (1).

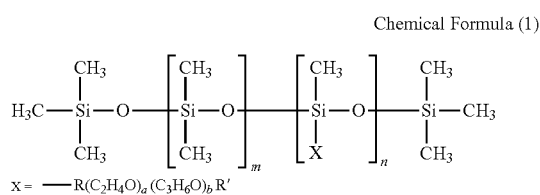

Chemical Formula (1)

In Chemical Formula (1), m represents 0 or an integer of from 1 to 10, n represent an integer of from 1 to 5, a represents 0 or an integer of from 1 to 20, b represents 0 or an integer of from 1 to 20, R represents an alkyl or alkylene group having 1 to 10 carbon atoms, and R' represents a hydrogen atom or an alkyl or alkylene group having 1 to 10 carbon atoms.

The polyoxyalkylene-modified dimethyl polysiloxane has a polyalkylene oxide structure at the Si site of dimethyl polysiloxane.

The silicone-based surfactant having the modification group mentioned above can be synthesized or procured.

Specific examples of the products include, but are not limited to, SA 0503A, SA G002, SA G005, KF-618, KF-642, and KF-643, all manufactured by Shin-Etsu Chemical Co., Ltd., EMULEX-SS-5602 and SS-1906EX, both manufactured by NIHON EMULSION Co., Ltd., FZ-210S, FZ-2118, FZ-2154, FZ-2161, FZ-2162, FZ-2163, and FZ-2164, all manufactured by Dow Corning Toray Co., Ltd., BYK-33 and BYK-387, both manufactured by BYK-Chemie GmbH, TSF-4440, TSF4452, and TSF 4453, all manufactured by Toshiba Silicone Co. Ltd., and TE GO Twin 4000, manufactured by Evonic.

In addition, the Hydrophilic-Lipophilic Balance (HLB) value of the silicone-based surfactant is not particularly limited and can be suitably selected to suit to a particular application. It is preferably from 8.0 to 11.5 percent by mass and more preferably from 9.0 percent by mass to 11.5 percent by mass to achieve good coloring.

The HLB value is calculated according to Griffin's method.

The proportion of the silicone-based surfactant to the entire ink is not particularly limited and it can be suitably selected to suit to a particular application. It is preferably from 0.5 to 1.5 percent by mass and more preferably from 0.7 percent by mass to 1.3 percent by mass to achieve good coloring and discharging stability.

Additive

The additive mentioned above is not particularly limited and it can be suitably selected to suit to a particular application. Examples include, but are not limited to, water, a surfactant, defoaming agent, preservatives and fungicides, pH regulator, and corrosion inhibitor.

The proportion of water in the ink is not particularly limited and it can be suitably selected to suit to a particular application. It is preferably from 10 to 90 percent by mass and more preferably from 20 to 60 percent by mass to enhance the drying property and discharging reliability of ink.

The defoaming agent is not particularly limited and can be suitably selected to suit to a particular application. For example, silicon-based defoaming agents, polyether-based defoaming agents, and aliphatic acid ester-based defoaming agents are suitable. These can be used alone or in combination. Of these, silicone-based defoaming agents are preferable to achieve the effect of foam breaking.

The preservatives and fungicides are not particularly limited and can be suitably selected to suit to a particular application. One specific example is 1,2-benzisothiazoline-3-one.

The corrosion inhibitor is not particularly limited and can be suitably selected to suit to a particular application. Specific examples include, but are not limited to, acid sulfite and sodium thiosulfate.

The pH regulator is not particularly limited and can be suitably selected to suit to a particular application as long as it can control a pH of 7 or greater. Specific examples include, but are not limited to, amines such as diethanol amine and triethanol amine.

Printing Device

The printing device includes a container containing an ink, a discharging device for discharging the ink to a substrate, the discharging device including a nozzle having a discharging orifice at a nozzle surface, a first heating device for heating a non-ink-discharged side of the substrate at a temperature of T1, and the second heating device for heating an ink-discharged side of the substrate at a temperature of T2, wherein the following relationship (1) is satisfied:

$$0 \text{ degrees C.} \le T2-T1 \le 90 \text{ degrees C.} \quad \text{Relationship (1)},$$

wherein the ink contains an organic solvent A having a boiling point of lower than 250 degrees C. an organic solvent B having a boiling point of 250 degrees C. or higher, and a resin, wherein the proportion of the organic solvent A to the ink is 30 percent by mass or less, wherein the proportion of the organic solvent B to the ink is from 1 to 3 percent by mass, wherein the proportion of the resin to the ink is from 5 to 15 percent by mass, wherein the ink has a viscosity of from 8.0 to 11.0 mPa·s at 25 degrees C. and from 5.5 to 11.0 mPa·s at 36 degrees C., wherein a droplet of the ink having a volume of 2.5 µL discharged to the substrate shrinks to 0.1 µL or less in 10.0 seconds or less at 25 degrees C.

Discharging Device

The discharging device is a nozzle having an orifice at the nozzle surface for discharging ink to a substrate. One example of the nozzle is a discharging head.

The discharging head preferably has a nozzle substrate and an ink repellent film on the surface of the nozzle substrate, which is the nozzle surface.

The nozzle substrate has orifices and it is not particularly limited regarding the number, shape, size, material, and structure. They can be suitably selected to suit to a particular application The nozzle substrate has an ink discharging surface and a liquid chamber bonding surface on the opposite side to the ink discharging surface. The ink is discharged from the ink discharging surface through the orifice The planar shape of the nozzle substrate is not particularly limited and can be suitably selected to suit to a particular application. Examples include a rectangle, a square, a rhombus, a circle, and an ellipse. The cross section of the nozzle substrate may be a flat plate-like shape or plate-like shape.

The size of the nozzle substrate is not particularly limited and it can be suitably selected to suit to the size of the nozzle plate.

There is no particular limit to the material for the nozzle substrate and it can be suitably selected to suit to a particular application.

Specific examples include, but are not limited to, Al, Bi, Cr, InSn, ITO, Nb, $Nb_2O_5$, NiCr, Si, $SiO_2$, Sn, $Ta_2O_5$, Ti, W, ZAO($ZnO+Al_2O_3$), and Zn. These can be used alone or in combination. Of these, stainless steel is preferable in terms of rust prevention.

There is no specific limitation to stainless steel and it can be suitably selected to suit to a particular application.

Specific examples include, but are not limited to, austenite-based stainless steel, ferrite-based stainless steel, martensite-based stainless steel, and precipitation curing-based stainless steel. These can be used alone or in combination.

At least the ink-discharging surface of the nozzle substrate may be subjected to oxygen plasma treatment for introducing a hydroxyl group, which enhances the attachability between the ink repellent film and the nozzle substrate.

The nozzle is not particularly limited with respect to the number, arrangement, spacing, and, the shape, size, and cross-sectional shape of the aperture and it can be suitably selected to suit to a particular application.

The arrangement of the nozzles is not particularly limited and can be suitably selected to suit to a particular. An arrangement of nozzles equally spaced therebetween along the length direction of a nozzle substrate is possible.

The nozzle arrangement depends on the type of ink discharged. It is preferably one or more lines or orifices and more preferably one to four lines.

The number of the orifices per line is not particularly limited and can be suitably select to suit to a particular application. It is preferably from 10 to 10,000 and more preferably from 50 to 500. The pitch P, the minimum distance between the centers of adjacent orifices, is not particularly limited and can be suitably selected to suit to a particular application. It is preferably from 21 to 169 μm.

The shape of the nozzle aperture mentioned above is not particularly limited and can be suitably selected to suit to a particular application. Circular, elliptical, and square shapes are suitable. Of these, a circular aperture is preferable for discharging ink droplets.

The ink repellent film mentioned above is formed on the ink discharging surface of the nozzle substrate mentioned above.

The ink repellent film is not particularly limited and can be suitably selected to suit to a particular application as long as it repels ink. The film preferably contains a fluorinated polyacrylate or polymer having a fluorinated heterocyclic structure in the main chain. Ink repellent film made of a fluorinated polyacrylate or polymer having a fluorinated heterocyclic structure in the main chain minimizes the surface free energy. As a result, even ink with low surface tension for use in the present disclosure can maintain a non-wettable state, which is preferable.

First Heating Device

The first heating device heats the non-ink-discharged side of the substrate mentioned above for drying the ink mentioned above.

The first heating device is not particularly limited as long as it can heat the non-ink-discharged side of a substrate and can be suitably selected to suit to a particular application. The first heating device can be heated wind or an infra-red heater.

The heating temperature $T1$ of the first heating device is preferably from 20 to 70 degrees C. A $T1$ of 20 degrees C. or higher enhances the drying property of ink discharged to a substrate. A $T1$ of 70 degrees C. or lower enhances the discharging stability of ink. In addition, the original texture of a substrate is maintained when the substrate is leather. $T1$ means the temperature of the first heating device.

Second Heating Device

The second heating device heats the ink-discharged side of the substrate mentioned above for drying the ink mentioned above.

The second heating device is not particularly limited as long as it can heat the ink-discharged side of a substrate and can be suitably selected to suit to a particular application.

Examples of the second heating device is a heated wind and an infra-red heater.

The heating temperature $T2$ is not particularly limited as long as it satisfies the relationship (1) and can be suitably selected to suit to a particular application. It is preferably from 35 to 90 degrees C.

$T2$ represents the temperature of the second heating device.

Ink Container

The ink container is not particularly limited and can be suitably selected to suit to a particular application. Specific examples include, but are not limited to, an ink filler and an ink tank.

An ink filler contains a container filled with the ink mentioned above and may include other optional suitably-selected members.

The container is not particularly limited. It is possible to determine the size, shape, structure, and material for a particular application.

The container may include an ink bag made of aluminum laminate film or resin film.

The ink tank includes a main tank and a sub-tank.

Stimulus Generating Device

The stimulus generating device generates a stimulus applied to ink.

The stimulus applied by a stimulus generating device is not particularly limited and can be suitably selected for a particular application. Examples include, but are not limited to, heat (temperature), pressure, vibration, and light. These can be used alone or in combination. Of these, heat and pressure are preferable.

Specific examples of the device include, but are not limited to:
- a heater;
- a pressure device;
- a piezoelectric actuator such as the piezoelectric element;
- a vibrator;
- an ultrasonic oscillator;
- light;
- a thermal phase change actuator actuated by boiling ink film with an electric heat conversion element such as a heat generating resistance;
- a temperature actuating shape-memory alloy actuator utilizing metal phase change; and an electrostatically actuated actuator A device such as a thermal head applies thermal energy to ink in an ink discharging head in response to recording signals when the stimulus is the heat. Bubbles are generated in ink upon the application of thermal energy. As the pressure of the bubbles increases, the ink discharging head discharges droplets of the ink through the nozzle.

One way of using pressure as a stimulus is to apply a voltage to the piezoelectric element attached to the site referred to as the pressure chamber in the ink flow path in an ink discharging head. The piezoelectric element bends upon the voltage application, and the pressure chamber shrinks accordingly, which makes the discharging head discharge ink droplets through the nozzle. Of these, the method of applying a voltage to a piezoelectric element is preferable for ink discharging.

Wiping Member

The printing method of the present disclosure may furthermore optionally include wiping the nozzle surface with a wiping member for removing dirt of ink droplets and impurities attached to the nozzle surface.

The wiping member is not particularly limited and can be suitably selected to suit to a particular application. It can be a wiper blade or unwoven fabric. Applying rinsing liquid to non-woven fabric as a wiping member is suitable for efficiently removing dirt and impurities.

The printing device and the printing method of the present disclosure are described with reference to FIGS. 1 to 3.

Figure 2:
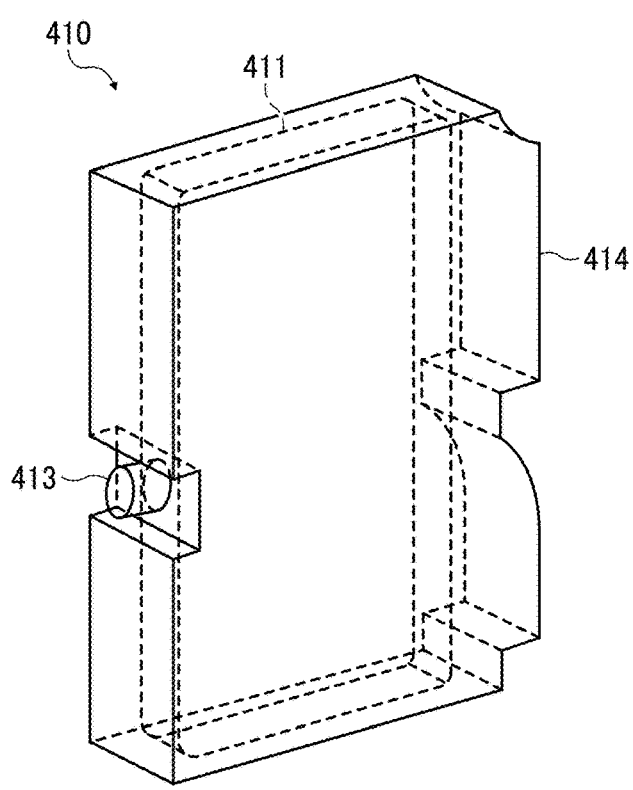
FIG. 2 is a diagram illustrating a perspective view of an example of the tank of the printing device according to an embodiment of the present disclosure.

FIG. 1 is a schematic diagram illustrating a perspective view of an example of the printing device of the present disclosure. The printing device illustrated in FIG. 1 is of a serial type. FIG. 2 is a diagram illustrating a perspective view of an example of the tank of the printing device of the present disclosure.

The printing device is an serial image forming apparatus. An image forming apparatus 400 includes a mechanical unit 420 in an exterior 401. Each ink accommodating unit (ink container) 411 of each tank 410 (410k, 410c, 410m, and 410y) for each color of black (K), cyan (C), magenta (M), and yellow (Y) is made of, for example, packaging material such as aluminum laminate film.

The ink accommodating unit 411 is housed in, for example, a plastic container housing unit 414 and L represents liquid contained in the ink accommodating unit 411. As a result, the tank 410 is used as an ink cartridge of each color.

A cartridge holder 404 is disposed on the rear side of the opening appearing when a cover 401c is opened. The tank 410 is detachably attached to the cartridge holder 404. In this configuration, each ink discharging outlet 413 of the tank 410 communicates with a discharging head 434 for each color via a supplying tube 436 for each color and the ink can be discharged from the discharging head 434 to a recording medium.

Figure 3:
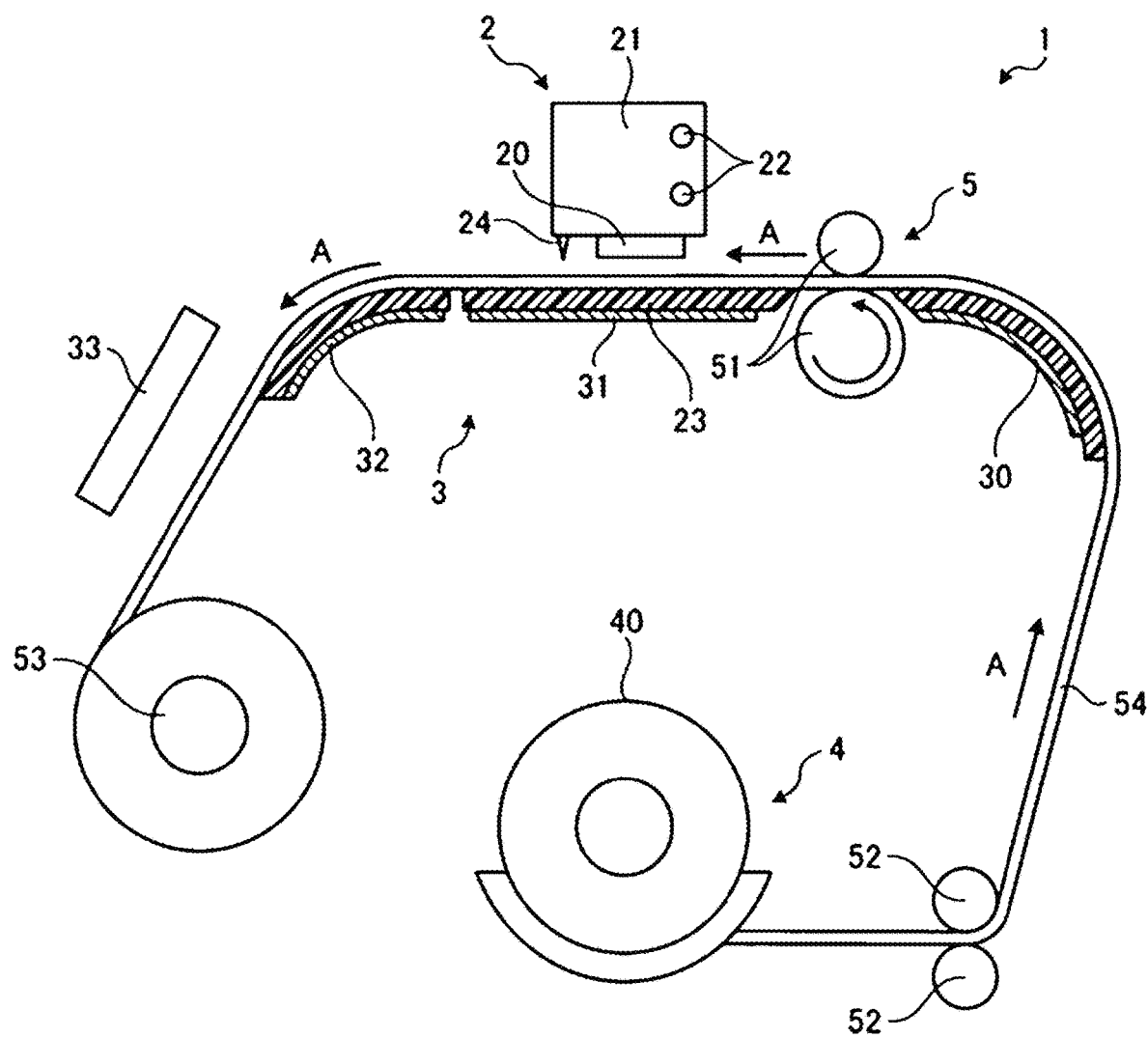
FIG. 3 is a schematic diagram illustrating an example of the printing device according to an embodiment of the present disclosure.

FIG. 3 is a schematic diagram illustrating the configuration of a printing device 1.

The printing device 1 is of a serial printer. As illustrated in FIG. 3, the printing device 1 includes an image forming unit 2 for printing images, a heating device 3, a roll medium accommodating unit 4, and a conveyance mechanism 5.

The roll medium accommodating unit 4 accommodates a roll medium 40 for printing. The roll medium accommodating unit 4 can accommodate the roll medium 40 having a different length along the width direction.

The roll medium 40 is not particularly limited and can be suitably selected to suit to a particular application. Examples include, but are not limited to, non-permeative media such as vinyl chloride (PVC), polyethylene terephthalate (PET) film, permeative media such as cloth and synthetic paper, and wall paper media made of polyester material.

The conveyance mechanism 5 constitutes a conveyor employing a roll-to-roll method.

The conveyance mechanism 5 includes a pair of nip rollers 51, a pair of driven rollers 52, and a reeling roller 53 on a conveyance route 54 of the roll medium 40.

The nip roller 51 is disposed upstream of the image forming unit 2 along a conveyance direction A indicated by an arrow in FIG. 3. The nip rollers 51 convey the roll medium 40 nipped by the rotation in accordance with the drive of motor towards the image forming unit 2.

The reeling roller 53 rotates in accordance with the drive of a motor M and reels up the roll medium 40 after printing.

The driven rollers 52 is rotationally driven in accordance with the conveyance of the roll medium 40.

The conveyance mechanism 5 includes a wheel encoder 55 for detecting the conveyance speed.

The conveyance mechanism 5 controls the conveyance speed by the motor control based on the speed detected by sampling the target value and the detected pulse from the wheel encoder 55.

The roll medium 40 accommodated in the roll medium accommodating unit 4 is conveyed to the image forming unit 2 in accordance with the rotation of the nip rollers 51 via the driven rollers 52.

The image forming unit 2 prints a target image on the roll medium 40 that has reached the image forming unit 2. The reeling roller 53 reels up the roll medium 40 in accordance with the rotation after printing.

The image forming unit 2 includes a carriage 21.

The carriage 21 is held slidable by guiding rods (guiding rail) 22.

The carriage 21 moves on the guiding rods 22 in the main scanning direction perpendicular to the conveyance direction A of the roll medium 40 in accordance with the drive of the motor M. The carriage 21 moves back and forth in the printable region of the image forming unit 2 to the roll medium 40 conveyed by the conveyance mechanism 5 in the main scanning region as the movable region in the main scanning direction.

The carriage 21 carries a printing head 20 having orifices arranged in lines for discharging droplets. The printing head 20 integrally includes a tank for supplying ink to the printing head 20. The printing head 20 may include a tank separately.

The printing head 20 serves as a liquid discharging unit and discharges ink droplets of each color of black (K), yellow (Y), magenta (M), and cyan (C) as the printing liquids of process colors. The black (K), yellow (Y), magenta (M), and cyan (C) are inks for image forming.

The image forming unit 2 includes a platen 23 for supporting the roll medium 40 below the printing head 20 when printing with the printing head 20.

The image forming unit 2 includes an encoder sheet for detecting the main scanning position of the carriage 21 along the main scanning direction of the carriage 21. The carriage 21 includes an encoder.

The image forming unit 2 detects the main scanning position of the carriage 21 by reading the encoder sheet by the encoder of the carriage 21.

The carriage 21 includes a sensor 24 for optically detecting the end of the roll medium 40 in accordance with the movement of the carriage 21. The detection signal by the sensor 24 is used for calculating the position of the end of the roll medium 40 in the main scanning direction and the width of the roll medium 40.

The heating device 3 includes a pre-heater 30, a platen heater 31 as the first heating device for use in the first heating, a drying heater 32 as the second heating device for use in the second heating, and the heated wind fan 33. Using one or both of the drying heater 32 and the heated wind fan 33 is possible. The pre-heater 30, the platen heater 31, and the drying heater 32 can be an electric heater using ceramic or nichrome wire.

The pre-heater 30 is disposed upstream of the image forming unit 2 in the conveyance direction A of the roll medium 40. The pre-heater 30 preliminarily heats the roll medium 40 the conveyance mechanism 5 is conveying.

The pre-heater 31 is disposed in the platen 23. The platen heater 31 heats the roll medium 40 where ink droplets are jetted from the nozzles of the printing head 20.

The drying heater 32 is disposed downstream of the image forming unit 2 in the conveyance direction A of the roll medium 40. The drying heater 32 keeps heating the roll medium 40 on which the image forming unit 2 has printed an image for accelerating the drying of the ink droplets on the roll medium 40.

The drying heater 33 is disposed downstream of the drying heater 32 (image forming unit 2) in the conveyance direction A of the roll medium 40. The heated wind fan 33 blows heated wind to the printed surface, ink-discharged surface, of the roll medium 40 where the ink has reached.

The heated wind fan 33 completely dries the ink on the printed surface of the roll medium 40 while decreasing the moisture in the atmosphere around the printed surface by directly blowing heated wind to the ink.

Thanks to of the heating device 3, the printing device 1 can print images on an ink-non-permeative medium such as polyvinylchloride film, polyethylene terephthalate (PET) film, and acrylic film as the roll medium 40.

The printing device 1 moves the carriage 21 back and forth within the width of the roll medium 40 and prints images one way or dual way of the movement of the carriage 21 while discharging ink from the printing head 20. Dual way printing is preferable for efficient printing. The action of discharging ink from the printing head 20 while the carriage 21 moves in the main scanning direction is counted as one scan.

The configuration of controlling the printing device 1 is described in, for example, Unexamined Japanese Patent Application Publication No. 2017-105193.

Substrate

The substrate mentioned above is not particularly limited and can be suitably selected to suit to a particular application. It includes paper substrate such as plain paler, glossy paper, and special paper, cloth for apparel such as T-shirt, and fabric.

The printing method of the present disclosure maintains a high level of coloring even for permeative substrates and provides excellent discharging stability, drying property, and abrasion resistance.

The cloth and fabric include knitted work, woven fabric, non-woven fabric, cloth and fabric made of fiber.

Specific examples of the material for use in the cloth and fabric include, but are not limited to, cellulose fiber derived from pulp, cotton, and hemp, synthetic fiber made from polyamide resin, polyacrylic resin, vinylon resin, vinylidene resin, polyvinyl alcohol, polyvinyl chloride, polyester resin, benzoate resin, polyclar, and phenol resin, natural fiber such as silk and wool, recycled fiber such as rayon fiber, cupra fiber, and lyocell fiber, semi-synthetic fiber such as acetate fiber, triacetate fiber, and promix fiber, metal fiber, glass fiber, and inorganic fiber such as rock fiber. These fibers can be used alone or in combination.

The cloth or fabric substrate can be obtained from fiber mixture of the cellulose fiber or natural fiber and the synthetic fiber mentioned above.

The permeation of the substrate mentioned above is defined by the volume change of ink discharged onto the substrate. The time taken for a droplet of ink having a volume of 2.5 µl discharged onto a permeative substrate to shrink to 0.1 µl or less is 10.0 seconds or less at 25 degrees C.

The contact angle meter for use in the evaluation of the permeation of a substrate is not particularly limited and can be suitably selected to suit to a particular application. One example is Dmo-5-1, manufactured by Kyowa Interface Science Co., LTD. For measurements, 2.5 µl of ink is extruded from a syringe equipped with a syringe needle. The ink extruded is discharged to a substrate and the volume change is measured by sessile drop method. Using a Teflon$^{trademark}$ syringe needle is preferable to enhance the reproducibility of measuring.

The volume of ink after the ink is placed on a substrate is calculated according to the following relationship.

$$V(t) = \frac{\pi R_v(t)^3 \tan\left(\frac{\theta_D(t)}{2}\right)\left(3 + \left(\tan\left(\frac{\theta_D(t)}{2}\right)\right)^2\right)}{6}$$

In the relationship, V(t) represents the volume in µl of ink on a substrate at a certain time, $R_v(t)$ represents the radius in mm of the ink droplet on the substrate at the certain time, and $\theta_D(t)$ represents the contact angle in radian of the ink droplet on the substrate at the certain time. Rv(t) and $\theta_D(t)$ are evaluated by using a contact angle meter. In the present disclosure, $\theta_D(t)$ is obtained by θ/2 method.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, embodiments of the present disclosure are described in detail with reference to Examples and Comparative Examples but are not limited thereto. In Examples, parts means parts by mass and percent means percent by mass excluding those in the evaluation criteria.

Preparation Example of Black Pigment Dispersion

A total of 11.2 g of styrene, 2.8 g of acrylic acid, 12 g of lauryl methacrylate, 4 g of polyethylene glycol methacrylate, 4 g of styrene macromer, and 0.4 g of mercapto ethanol were mixed in a flask followed by heating to 65 degrees C.

Next, a liquid mixture of 100.8 g of styrene, 25.2 g of acrylic acid, 108 g of lauryl methacrylate, 36 g of polyethylene glycol methacrylate, 60 g of hydroxyethyl methacrylate, 36 g of styrene macromer, 3.6 g of mercapto ethanol, 2.4 g of azobismethyl valeronitrile, and 18 g of methylethyl ketone was added dropwise to the flask in two and a half hours. Subsequently, a liquid mixture of 0.8 g of azobismethyl valeronitrile and 18 g of methyl ethyl ketone was added dropwise to the flask in half an hour.

After one-hour aging at 65 degrees C., 0.8 g of azobismethyl valeronitrile was added followed by aging for another hour to allow reaction. After the reaction was complete, 364 g of methylethyl ketone was added to the flask to obtain 800 g of a polymer solution A having a concentration of the solid portion of 50 percent.

Next, 28 g of the polymer solution A, 42 g of carbon black (Black Pearls 1000, manufactured by Cabot Corporation), 13.6 g of 1 mol/L potassium hydroxide solution, 20 g of methylethyl ketone, and 13.6 g of water were sufficiently stirred followed by mixing and kneading with a roll mill to obtain a paste.

The obtained paste was placed in 200 g of pure water followed by sufficient stirring.

Methylethyl ketone was removed with an evaporator followed by pressure-filtering with a polyvinylidene fluoride membrane filter having an average pore diameter of 5 μm. The moisture of the filtrate was adjusted to obtain a black pigment dispersion of styrene-acrylic-based resin-coated black pigment having a concentration of solid portion of 20 percent.

Manufacturing Example of Cyan Pigment Dispersion

A cyan pigment dispersion having a concentration of solid portion of 20 percent was obtained in the same manner as in the preparation of black pigment dispersion except that Pigment Blue 15:4 (SMART Cyan 3154BA, manufactured by Sensient Technologies Corporation) was used instead of carbon black.

Manufacturing Example of Magenta Pigment Dispersion

A magenta pigment dispersion having a concentration of solid portion of 20 percent was obtained in the same manner as in the preparation of black pigment dispersion except that Pigment Red 122, manufactured by Sun Chemical Corporation, was used instead of carbon black.

Preparation Example of Yellow Pigment Dispersion

A yellow pigment dispersion having a concentration of solid portion of 20 percent was obtained in the same manner as in the preparation of black pigment dispersion except that Pigment Yellow 74 (SMART Yellow 3074BA, manufactured by Sensient Technologies Corporation) was used instead of carbon black.

Synthesis Example 1 of Polyester-based Urethane Resin Emulsion

A total of 124.4 g of polyester polyol (POLYLITE$^{registered}$ OD-X-2251, average molecular weight of 2,000, manufactured by DIC Corporation), 9.7 g of 2,2-dimethylol propionic acid, 29.8 g of isophorone diisocyanate, and 77.1 g of methyl ethyl ketone as an organic solvent were allowed to react in a nitrogen-substituted container equipped with a thermometer, a nitrogen gas-introducing tube, and a stirrer, using 0.06 g of dibutyltin dilaurate (DMTDL) as a catalyst. Four hours later, 30.7 g of methylethyl ketone was supplied as a diluting agent to continue the reaction. When the average molecular weight of the reaction product reached the range of from 20,000 to 60,000, 1.4 g of methanol was charged in the container to complete the reaction, so that an organic solvent solution of urethane resin was obtained. A total of 13.4 g of potassium hydroxide aqueous solution at 48 percent by mass was added to the organic solvent solution of urethane resin to neutralize the carboxyl group contained in the urethane resin. Thereafter, 715.3 g of water was added followed by sufficient stirring and aging and solvent removal, thereby obtaining a polyester-based urethane resin emulsion 1 having a solid portion of 30 percent by mass. The glass transition temperature of the polyester-based urethane resin emulsion 1 was measured, which was 74 degrees C. The volume average particle diameter was 69 nm.

Synthesis Example 2 of Polyester-based Urethane Resin Emulsion

A total of 100 g of methylethyl ketone, 345 g of polyesterpolyol (1) (which was obtained from iPA/AA=6/4 in molar ratio and EG/NPG=119 in molar ratio, where iPA=isophthalic acid, AA=adipic acid, EG=ethylene glycol, and NPG=neopentyl glycol, number average molecular weight of 2,000, number of average functional groups=2), and 9.92 g of 2,2-dimethylol propionic acid (DMPA) were placed in a 2 L reaction container equipped with a stirrer, a thermometer, a nitrogen sealing tube as a nitrogen introducing tube, and a condenser followed by uniform mixing at 60 degrees C.

Thereafter, 45.1 g of triethylene glycol diisocyanate (TE GDI) and 0.08 g of dioctyltin dilaurate (DOTDL) were loaded therein to allow reaction at 72 degrees C. for three hours to obtain a polyurethane solution. To this polyurethane solution, there were added 80 g of isophtharic acid (IPA), 220 g of methylethyl ketone (MEK), 3.74 g of triethanolamine (TEA), and 596 g of water for phase transfer. Subsequently, MEK and IPA were removed by a rotary evaporator to obtain polyester-based urethane resin emulsion 2. After the thus-obtained aqueous emulsion was cooled down to room temperature, deionized water and aqueous solution of sodium hydroxide were added to adjust the solution such that the solid portion thereof was 30 percent by mass and the pH was 8. The glass transition temperature of the polyester-based urethane resin emulsion 2 was measured, which was −5 degrees C. The volume average particle diameter was 88 nm.

Synthesis Example 1 of Polyether-based Urethane Resin Emulsion

A total of 100.2 g of polyether polyol (PT MG1000, average molecular weight of 1,000, manufactured by Mitsubishi Chemical Corporation), 15.7 g of 2,2-dimethylol propionic acid, 48.0 g of isophorone diisocyanate, and 77.1 g of methyl ethyl ketone as an organic solvent were allowed to react in a nitrogen-substituted container equipped with a thermometer, a nitrogen gas-introducing tube, and a stirrer, using 0.06 g of dibutyltin dilaurate (DMTDL) as a catalyst. Four hours later, 30.7 g of methyl ethyl ketone was supplied as a diluting agent to continue the reaction. When the average molecular weight of the reaction product reached the range of from 20.000 to 60,000, 1.4 g of methanol was charged in the container to complete the reaction, so that an organic solvent solution of urethane resin was obtained. A total of 13.4 g of potassium hydroxide aqueous solution at 48 percent by mass was added to the organic solvent solution of urethane resin to neutralize the carboxyl group in the urethane resin. Thereafter, 715.3 g of water was added followed by sufficient stirring and aging and solvent removal, thereby obtaining a polyether-based urethane resin emulsion having a solid portion of 30 percent by mass. The glass transition temperature of the polyether-based urethane resin emulsion was measured, which was 43 degrees C. The volume average particle diameter was 121 nm.

Synthesis Example 1 of Polycarbonate-based Urethane Resin Emulsion

A total of 1,500 g of polycarbonate diol (reaction product having a number average molecular weight (Mn) of 1,200 of 1,6-hexane diol and dimethyl carbonate), 220 g of 2,2-dimethylol propionic acid (DMPA), and 1,347 g of N-methyl pyrrolidone (NMP) were charged in a reaction container equipped with a stirrer, a reflux cooling tube, and a thermometer in a nitrogen atmosphere followed by heating to 60 degrees C. to dissolve DMPA. Thereafter, 1,223 g (5.5 mol) of isophorone diisocyanate and 2.6 g of dibutyl tin dilaurylate as a catalyst were added thereto and the resulting substance was heated to 90 degrees C. to complete urethanation reaction in five hours. An isocyanate-terminated urethane prepolymer was obtained as a result. This reaction mixture was cooled down to 80 degrees C. and 149 g of triethyl amine was admixed therewith. A total of 4,340 g of the resulting mixture was extracted and loaded in a liquid mixture of 5.400 g of water and 15 g of triethyl amine during vigorous stirring. Thereafter, 1,500 g of ice and 626 g of 35 percent aqueous solution of 2-methyl-1,5-pentane diamine were added to allow chain elongation reaction followed by distillation away of the solvent to adjust the solid portion concentration to 30 percent by mass, so that polycarbonate urethane resin emulsion 1 was obtained. The glass transition temperature of the polycarbonate-based urethane resin emulsion 1 was measured, which was 83 degrees C. The volume average particle diameter was 71 nm.

Synthesis Example 2 of Polycarbonate-based Urethane Resin Emulsion

A total of 1,500 g of polycarbonate diol (reaction product having a number average molecular weight (Mn) of 1,200 from 1,6-hexane diol and dimethyl carbonate), 220 g of 2,2-dimethylol propionic acid (DMPA), and 1,347 g of N-methyl pyrrolidone (NMP) were charged in a reaction container equipped with a stirrer, a reflux cooling tube, and a thermometer in a nitrogen atmosphere followed by heating to 60 degrees C. to dissolve DMPA. Thereafter, 1,445 g (5.5 mol) of 4,4'-dicyclohexyl methane diisocyanate and 2.6 g of dibutyl tin dilaurylate (catalyst) were added thereto followed by heating to 90 degrees C. to complete urethanification reaction in five hours. An isocyanate-terminated urethane prepolymer was obtained as a result. This reaction mixture was cooled down to 80 degrees C. and 149 g of triethyl amine was admixed therewith. Thereafter, 4,340 g of the resulting mixture was extracted and charged in a liquid mixture of 5,400 g of water and 15 g of triethyl amine under vigorous stirring. Thereafter, 1,500 g of ice and 626 g of 35 percent aqueous solution of 2-methyl-1,5-pentane diamine were added to allow chain elongation reaction followed by distillation away of the solvent to adjust the solid portion concentration to 30 percent by mass, so that polycarbonate urethane resin emulsion 2 was obtained. The glass transition temperature of the polycarbonate-based urethane resin emulsion 2 was measured, which was 55 degrees C. The volume average particle diameter was 55 nm.

Synthesis Example 1 of Acrylic Resin Emulsion

A total of 900 g of deionized water and 1 g of sodium lauryl sulfate were charged in a reaction container equipped with a stirrer, a reflux condenser, a dripping device, and a thermometer and heated to 70 degrees C. while replacing nitrogen during stirring. While keeping the temperature inside at 70 degrees C., 4 g of potassium persulfate as polymerization initiator was added and dissolved in the container. An emulsified material preliminarily prepared by adding 365 g of styrene, 545 g of butyl acrylate, and 10 g of methacrylic acid to 450 g of deionized water, 3 g of sodium lauryl sulfate, and 20 g of acrylamide while being stirred was continuously added dropwise to the reaction solution in four hours. After the addition, the resulting solution was aged for three hours. After the thus-obtained aqueous emulsion was cooled down to room temperature, deionized water and sodium hydroxide aqueous solution were added to adjust pH to 9 to obtain an acrylic resin emulsion 1 having a concentration of solid content of 30 percent by mass. The glass transition temperature of the acrylic resin emulsion 1 was measured, which was 86 degrees C. The volume average particle diameter was 158 nm.

Synthesis Example 2 of Acrylic Resin Emulsion

A total of 900 g of deionized water and 1 g of sodium lauryl sulfate were charged in a reaction container equipped with a stirrer, a reflux condenser, a dripping device, and a thermometer and heated to 70 degrees C. while replacing nitrogen during stirring.

While keeping the temperature inside at 70 degrees C., 4 g of potassium persulfate as polymerization initiator was added and dissolved in the container. An emulsified material preliminarily prepared by adding 568 g of acrylic acid-2-ethylhexyl and 447 g of methyl methacrylate to 450 g of deionized water and 3 g of sodium lauryl sulfate while being stirred was continuously added dropwise to the reaction solution in four hours. After the addition, the resulting solution was aged for three hours. After the thus-obtained aqueous emulsion was cooled down to room temperature, deionized water and sodium hydroxide aqueous solution were added to adjust pH to 8 to obtain an acrylic resin emulsion 2 having a concentration of solid content of 30 percent by mass. The glass transition temperature of the acrylic resin emulsion 2 was measured, which was −21 degrees C. The volume average particle diameter was 152 nm.

Measuring of Glass Transition Temperature

The glass transition temperature of resin particles was measurable by DSC SYSTEM Q-2000 (manufactured by TA INSTRUMENTS. JAPAN). Specifically, a liquid dispersion of resin particle was heated and dried in an oven at 70 degrees C. for 12 hours or more and 5 g of the obtained solid content thereof was loaded in an aluminum sample container, which was placed in the measuring instrument. The glass transition temperature was measured in a nitrogen atmosphere under the following processes (1) to (4). Based on the DSC curve at the second temperature rising (process (4)), the glass transition temperature was obtained by the midpoint method. The measuring results are shown in Table 1 and Table, 2. The values of the glass transition temperature shown in Tables 1 and 2 are represented in percent.

(1) The liquid dispersion was cooled down to −70 degrees C. which was maintained five minutes
(2) The liquid dispersion was then heated to 120 degrees C. at a temperature rising rate of 10 degrees C. per minute
(3) The liquid dispersion was cooled down to −70 degrees C., which was maintained five minutes
(4) The liquid dispersion was then heated to 120 degrees C. at a temperature rising rate of 10 degrees C. per minute Measuring Volume Average Particle Diameter A measuring sample was diluted with pure water to a resin particle concentration of 0.01 percent by mass. The volume average particle diameter of the diluted sample was measured by using a Microtrac UPA-150, manufactured by NIKKISO CO., LTD.

Preparation Example of ink A

Deionized water was added as a balance to the following formulation so as to make the total 100 parts. The resulting substance was mixed and stirred followed by filtering with a filter having an average pore diameter of 5 µm (Minisart$^{registered}$ manufactured by Sartorius Stedim Biotech GmbH) to obtain ink A.

| Ink Formulation | |
|---|---|
| Black pigment dispersion mentioned above: | 20 parts |
| Polyester-based urethane resin 1 having a volume average particle diameter of 69 nm: | 4 parts |
| Polycarbonate-based urethane resin emulsion 3, TAKELAC$^{trademark}$ W6110, having a volume average particle diameter of 41 nm: | 5 parts |
| SAG503A, silicone surfactant having an HLB value of 11, manufactured by Nissin Chemical co., ltd.: | 1 part |
| 1,3-propane diol, manufactured by DuPont de Nemours, Inc.: | 3 parts |
| 3-methyl-1,3-butane diol under the product name of isoprene glyol, manufactured by KURARAY CO., LTD.: | 25 parts |
| Glycerin, manufactured by Sakamoto Yakuhin Kogyo Co., Ltd.: | 2 parts |
| PROXEL LV, preservatives and fungicides, manufactured by AVECIA GROUP: | 0.1 parts |

Deionized water: balance to make the total 100 parts

Preparation Examples of Ink B to Ink P

Inks B to P were prepared in the same manner as in Preparation Example of ink A except that the ink formulation was changed to those shown in Tables 1 and 2. The contents of the resin in Tables 1 and 2 are represented in solid mass.

The details of each component in Tables 1 to 2 are as follows.

- 1,2-ppropanediol under the product name of propylene glycol, manufactured by ADEKA CORPORATION
- 1,4-butanediol, manufactured by Tokyo Chemical Industry Co. Ltd.
- 2,3-butanediol, manufactured by Tokyo Chemical Industry Co. Ltd.
- 1,5-pentanediol, manufactured by Tokyo Chemical Industry Co. Ltd.
- 3-methoxy-3-methyl-1-butanol, SOLFIT, manufactured by KURARAY CO., LTD.
- Triethylene glycol monobutyl ether, manufactured by Tokyo Chemical Industry Co. Ltd.
- SA G002, silicone-based surfactant having an HLB value of 12, manufactured by Nissin Chemical co., ltd.
- SA G005, silicone-based surfactant having an HLB value of 7, manufactured by Nissin Chemical co., ltd.
- TEGO Twin 4000, silicone-based surfactant, manufactured by Evonic
- FS-300, fluorochemical surfactant, manufactured by E.I. du Pont de Nemours and Company
- Cyan pigment dispersion
- Magenta pigment dispersion
- Yellow pigment dispersion
- Polyester-based urethane resin 2
- Polyether-based urethane resin
- Polycarbonate-based urethane resin 1
- Polycarbonate-based urethane resin 2
- Acrylic resin emulsion 1
- Acrylic resin emulsion 2

Measuring of Ink Viscosity

The viscosity of ink was measured by a viscometer RE80L, manufactured by TOKI SANGYO CO., LTD., under the following conditions. The measuring results of the viscosity of each ink were shown in Tables 1 and 2.

Measuring Conditions

Cone rotor: Standard cone rotor (0° 34'×R24)
Amount of liquid sample: 1.2 mL
Rate of rotation: 50 rpm
Measuring time: 3 minutes
Temperature: 25 and 36 degrees C.

Example 1

Printed matter was obtained by printing on Light Fabric, polyester woven fabric, with the ink A in the ink tank carried inside Ri100, manufactured by Ricoh Co., Ltd. The printing condition was printing 100 percent gradation color beta image on a T-shirt as a substrate in "Fast mode" while heating at 55.0 degrees C. using a silicon bar heater (First Heating). Thereafter, the ink-discharged surface of the T-shirt was heated at 100.0 degrees C. for 3 minutes using a heated wind heating unit (Second Heating).

Examples 2 to 13 and Comparative Examples 1 to 6

Printing was performed in the same manner as in Example 1 except that the ink A was changed to the ink B to ink 1 as shown in Table 3 to 5.

Method of Measuring Time Taken for Ink on Substrate to Shrink to 0.1 µl

The time taken for ink on a substrate to shrink to 0.1 µl was measured for the combinations of the inks of Examples 1 to 13 and Comparative Examples 1 to 6 with the substrate. The results are shown in Tables 1 and 2.

Measuring Conditions

Device for evaluation: Dmo-5-1, manufactured by Kyowa Interface Science Co., LTD.
Measuring method: Sessile drop method
Syringe needle; Teflon$^{trademark}$ needle, inner diameter of 0.37 µm
Temperature: 25 degrees C.
Measuring interval: 0.1 sec.
Volume of ink droplet: 2.5 µl
Method of analyzing contact angle: θ/2 method
Substrate: Light Fabric, manufactured by Hewlett-Packard Company Blurring, drying, and discharging stability are evaluated in Examples 1 to 13 and Comparative Examples 1 to 6. The results are shown in Tables 3 to 5.

Blurring

In Examples 1 to 13 and Comparative Examples 1 to 6, ink in which the black pigment dispersion was replaced with the cyan pigment dispersion, ink in which the cyan pigment dispersion was replaced with the magenta pigment dispersion, ink in which the magenta pigment dispersion was replaced with the yellow pigment dispersion, and ink in which the yellow pigment dispersion was replaced with the black pigment dispersion were prepared. The inks A to P and inks in which the pigment dispersions were replaced were printed. The color boundary of the obtained images was visually checked and evaluated. Grade B or above is usable for practical purpose.

Evaluation Criteria

A: Blurring at color boundary was not present at all
B: Slight blurring was present at one to five sites
C: Slight blurring was present at six to ten sites
D: Significant blurring was present, which degrades the image quality Drying Property Using the inkjet printer mentioned above, a solid image of an amount of attached of 1.5 g/m² was printed. After printing, the printed matter was placed in a drier at 100 degrees C. and taken out therefrom changing the drying time. The solid portion was touched to check whether transfer occurred. The drying property was evaluated by the time taken for the solid image to dry until no transfer occurred according to the following evaluation criteria. Grade C or above is usable for practical purpose.

Evaluation Criteria

A: No transfer occurred in a drying time of less than 15 seconds

B: No transfer occurred in a drying time of from 15 to less than 30 seconds

C: No transfer occurred in a drying time of from 30 to less than 45 seconds

D: Transfer still occurred after drying for 45 second or more

Discharging Stability

A 15 cm×20 cm solid image was printed on a substrate followed by printing a chart for determining nozzle omission and counting the number of nozzle omissions. The discharging stability was evaluated based on the ratio of the number of nozzle omissions to the entire number of nozzles according to the following evaluation criteria. Grade B or above is usable for practical purpose.

Evaluation Criteria

A: 5 percent or less

B: 5 to less than 10 percent

C: 10 to less than 15 percent

D: 15 percent or greater

TABLE 1

| Composition of ink set | Ink | | | | | | | |
|---|---|---|---|---|---|---|---|---|
| | A | B | C | D | E | F | G | H |
| Black pigment dispersion | 20 | | | | | 20 | | |
| Cyan pigment dispersion | | | | 20 | | | | 20 |
| Magenta pigment dispersion | | | 20 | | | | 20 | |
| Yellow pigment dispersion | | 20 | | | 20 | | | |
| Polyester-based urethane resin 1, Tg of 74 degrees C. | 4.0 | | | | | 4.0 | | |
| Polyester-based urethane resin 2, Tg of −5 degrees C. | | | 6.0 | | 5.0 | 5.0 | | |
| Polyether-based urethane resin, Tg of 43 degrees C. | | | | 6.0 | | | 3.0 | 8.0 |
| Polycarbonate-based urethane resin 1, Tg of 83 degrees C. | | 6.0 | | | 5.0 | | | |
| Polycarbonate-based urethane resin 2, Tg of 55 degrees C. | | | 5.0 | | | | | |
| Polycarbonate-based urethane resin 3, W6110, Tg of −20 degrees C. | 5.0 | 4.0 | | 4.0 | | | 7.0 | 3.0 |
| Acrylic resin 1, Tg of 86 degrees C. | | | | | | | | |
| Acrylic resin 2, Tg of −21 degrees C. | | | | | | | | |
| Fluorochemical surfactant, FS-300 | | | | | | | 1.6 | |
| Silicone-based surfactant, Twin 4000 | | | | | | 0.8 | | |
| Silicone-based surfactant, SA G503A | 1.0 | 1.0 | 0.4 | | | | | 0.4 |

TABLE 1-continued

| Composition of ink set | Ink | | | | | | | |
|---|---|---|---|---|---|---|---|---|
| | A | B | C | D | E | F | G | H |
| Silicone-based surfactant, SA G002 | | | | | | | 1.0 | |
| Silicone-based surfactant, SA G005 | | | | 1.2 | | | | |
| 1,2-propanediol, boiling point of 187 degrees C. | | | 8 | | | 3 | | |
| 1,3-propanediol, boiling point of 213 degrees C. | 3 | | | | 3 | | | |
| 1,4-butanediol, boiling point of 230 degrees C. | | | | 10 | | | | 5 |
| 2,3-butanediol, boiling point of 177 degrees C. | | 6 | 10 | 8 | 10 | 15 | 20 | 10 |
| 1,5-pentanediol, boiling point of 242 degrees C. | | | 10 | | 5 | | 8 | 13 |
| 3-methyl-1,3-butanediol, boiling point of 205 degrees C. | 25 | 10 | | | | 5 | | |
| 3-methoxy-3-methyl-1-butanol, boiling point of 175 degrees C. | | 10 | | 10 | 10 | 5 | | |
| Glycerin, boiling point of 290 degrees C. | 2 | 2 | 2 | 1.2 | 2 | 2 | | 2 |
| Triethylene glycol monobutyl ether, boiling point of 278 degrees C. | | | | | | | 1 | |
| PROXEL LV, manufactured by AVECIA GROUP | 0.1 | 0.1 | 0.1 | 0.1 | 0.1 | 0.1 | 0.1 | 0.1 |
| Highly pure water | Balance | Balance | Balance | Balance | Balance | Balance | Balance | Balance |
| Total amount | 100 | 100 | 100 | 100 | 100 | 100 | 100 | 100 |
| Permeability to substrate (seconds) | 2.2 | 2.4 | 2.2 | 1.6 | 2.4 | 1 | 2.6 | 2.2 |
| Viscosity at 25 degrees C. (mPa·s) | 10 | 11 | 10 | 9.4 | 10 | 9.8 | 10 | 11 |
| Viscosity at 36 degrees C. (mPa·s) | 7.4 | 8.1 | 8.3 | 8 | 8.2 | 7 | 7.3 | 8.6 |

TABLE 2

| Composition of ink set | Ink | | | | | | | |
|---|---|---|---|---|---|---|---|---|
| | I | J | K | L | M | N | O | P |
| Black pigment dispersion | | 20 | | | | | 20 | 20 |
| Cyan pigment dispersion | | | | 20 | | | | |
| Magenta pigment dispersion | 20 | | | | | 20 | | |
| Yellow pigment dispersion | | | 20 | | 20 | | | |

TABLE 2-continued

| Composition of ink set | Ink | | | | | | | |
|---|---|---|---|---|---|---|---|---|
| | I | J | K | L | M | N | O | P |
| Polyester-based urethane resin 1, Tg of 74 degrees C. | 2.0 | | | 2.0 | | 8.0 | | 4.0 |
| Polyester-based urethane resin 2, Tg of −5 degrees C. | 7.0 | | | | | | 8.0 | |
| Polyether-based urethane resin, Tg of 43 degrees C. | | | 6.0 | | 10.0 | | | |
| Polycarbonate-based urethane resin 1, Tg of 83 degrees C. | | 4.0 | | | | | | |
| Polycarbonate-based urethane resin 2, Tg of 55 degrees C. | | | | | | | 4.0 | |
| Polycarbonate-based urethane resin 3, W6110, Tg of −20 degrees C. | | | | | 6.0 | | | 5.0 |
| Acrylic resin 1, Tg of 86 degrees C. | | | 6.0 | 2.5 | | | | |
| Acrylic resin 2, Tg of −21 degrees C. | | 6.0 | | | | 6.0 | | |
| Fluorochemical surfactant, FS-300 | | 1.0 | | | | | | |
| Silicone-based surfactant, Twin 4000 | | | | | | 1.0 | | |
| Silicone-based surfactant SA G503A | | | | 1.0 | | | | 1.0 |
| Silicone-based surfactant, SA G002 | 1.6 | | | | | | 0.8 | |
| Silicone-based surfactant, SA G005 | | | 0.8 | | 0.8 | | | |
| 1,2-propanediol, boiling point of 187 degrees C. | | 10 | | 10 | | 10 | | |
| 1,3-propanediol, boiling point of 213 degrees C. | 10 | | 5 | 10 | 10 | 10 | | 3 |
| 1,4-butanediol, boiling point of 230 degrees C. | | 10 | | | | 10 | | |
| 2,3-butanediol, boiling point of 177 degrees C. | 10 | | | | 10 | 8 | | |
| 1,5-pentanediol, boiling point of 242 degrees C. | | | 3 | | | | | |
| 3-methyl-1,3-butanediol, boiling point of 205 degrees C. | 8 | | 20 | | | 10 | | 21 |

TABLE 2-continued

| Composition of ink set | I | J | K | L | M | N | O | P |
|---|---|---|---|---|---|---|---|---|
| 3-methoxy-3-methyl-1-butanol, boiling point of 175 degrees C. | | 8 | | 3 | | 5 | 3 | |
| Glycerin, boiling point of 290 degrees C. | 2 | 2 | | 2 | | 3.5 | 1 | 2 |
| Triethylene glycol monobutyl ether, boiling point of 278 degrees C. | | | 1.5 | | 1.5 | | | |
| PROXEL LV, manufactured by AVECIA GROUP | 0.1 | 0.1 | 0.1 | 0.1 | 0.1 | 0.1 | 0.1 | 0.1 |
| Highly pure water | Balance | Balance | Balance | Balance | Balance | Balance | Balance | Balance |
| Total amount | 100 | 100 | 100 | 100 | 100 | 100 | 100 | 100 |
| Permeability to substrate (seconds) | 1.2 | 1.8 | 2.4 | 0.6 | 1.9 | 1.6 | 0.9 | 2.2 |
| Viscosity at 25 degrees C. (mPa·s) | 9.5 | 10 | 11 | 5.5 | 11 | 10 | 9.5 | 8.5 |
| Viscosity at 36 degrees C. (mPa·s) | 7.1 | 8.3 | 8.4 | 3.7 | 9.1 | 8.5 | 6.7 | 5.5 |

TABLE 3

| | | Example 1 Ink A | Example 2 Ink B | Example 3 Ink C |
|---|---|---|---|---|
| Heating temperature T1 degrees C. in first heating | | 55.0 | 55.0 | 40.0 |
| Heating temperature T2 degrees C. in second heating | | 100.0 | 90.0 | 85.0 |
| T2 − T1 degrees C. | | 45.0 | 35.0 | 45.0 |
| Evaluation result | Blurring | A | A | B |
| | Drying property | A | B | C |
| | Discharging stability | A | A | A |

| | | Example 4 Ink D | Example 5 Ink E | Example 6 Ink F |
|---|---|---|---|---|
| Heating temperature T1 degrees C. in first heating | | 35.0 | 55.0 | 40.0 |
| Heating temperature T2 degrees C. in second heating | | 110.0 | 85.0 | 90.0 |
| T2 − T1 degrees C. | | 75.0 | 30.0 | 50.0 |
| Evaluation result | Blurring | B | A | B |
| | Drying property | A | B | C |
| | Discharging stability | A | B | A |

TABLE 4

| | | Example 7 Ink G | Example 8 Ink H | Example 9 Ink I | Example 10 Ink J |
|---|---|---|---|---|---|
| Heating temperature T1 degrees C. in first heating | | 45.0 | 50.0 | 65.0 | 60.0 |
| Heating temperature T2 degrees C. in second heating | | 110.0 | 95.0 | 70.0 | 100.0 |
| T2 − T1 degrees C. | | 65.0 | 45.0 | 5.0 | 40.0 |
| Evaluation result | Blurring | B | A | A | A |
| | Drying property | A | B | C | A |
| | Discharging stability | B | A | B | B |

| | | Example 11 Ink K | Example 12 Ink H | Example 13 Ink P |
|---|---|---|---|---|
| Heating temperature T1 degrees C. in first heating | | 28.0 | 18.0 | 55.0 |
| Heating temperature T2 degrees C. in second heating | | 115.0 | 105.0 | 100.0 |
| T2 − T1 degrees C. | | 87.0 | 87.0 | 45.0 |
| Evaluation result | Blurring | B | B | A |
| | Drying property | A | C | A |
| | Discharging stability | B | A | A |

TABLE 5

|  | Comparative Example 1 Ink L | Comparative Example 2 Ink M | Comparative Example 3 Ink N |
|---|---|---|---|
| Heating temperature T1 degrees C. in first heating | 40.0 | 55.0 | 30.0 |
| Heating temperature T2 degrees C. in second heating | 85.0 | 80.0 | 95.0 |
| T2 − T1 degrees C. | 45.0 | 25.0 | 65.0 |
| Evaluation result Blurring | C | B | D |
| Drying property | D | B | D |
| Discharging stability | B | D | B |

|  | Comparative Example 4 Ink O | Comparative Example 5 Ink E | Comparative Example 6 Ink I |
|---|---|---|---|
| Heating temperature T1 degrees C. in first heating | 45.0 | 45.0 | 30.0 |
| Heating temperature T2 degrees C. in second heating | 60.0 | 40.0 | 125.0 |
| T2 − T1 degrees C. | 15.0 | −5.0 | 95.0 |
| Evaluation result Blurring | B | B | D |
| Drying property | D | D | A |
| Discharging stability | A | A | C |

Aspects of the present disclosure include, but are not limited to the following:

1. A printing method includes discharging ink to a substrate, heating an ink-not-discharged side of the substrate at a temperature of T1, and heating an ink-discharged side of the substrate at a temperature of T2, wherein the following relationship (1) is satisfied: 0 degrees C.≤T2−T1≤90 degrees C. Relationship (1), wherein the ink contains an organic solvent A having a boiling point of lower than 250 degrees C., an organic solvent B having a boiling point of 250 degrees C. or higher, and a resin, wherein the proportion of the organic solvent A to the ink is 30 percent by mass or less, wherein the proportion of the organic solvent B to the ink is from 1 to 3 percent by mass, wherein the proportion of the resin to the ink is from 5 to 15 percent by mass, wherein the ink has a viscosity of from 8.0 to 11.0 mPa·s at 25 degrees C., wherein the ink has a viscosity of from 5.5 to 11.0 mPa·s at 36 degrees C., wherein a droplet of the ink having a volume of 2.5 μL discharged to the substrate shrinks to 0.1 μL or less in 10.0 seconds or less at 25 degrees C.

2. The printing method according to 1 mentioned above, wherein T1 is from 20 to 70 degrees C.

3. The method according to 1 or 2 mentioned above, wherein, in the heating an ink-not-discharged side, the ink-not-discharged side is heated by at least one of a heated wind heater or an infrared OR) heater.

4. The printing method according any one of 1 to 3 mentioned above, wherein the resin contains resin particles containing at least one type of resin having a glass transition temperature of 0 degrees C. or lower.

5. The printing method according to any one of 1 to 4 mentioned above, wherein the resin particles contains urethane resin particles.

6. The method according to 4 or 5 mentioned above, wherein the proportion of the particles to the resin is from 30 to 70 percent by mass.

7. The printing method according to any one of 1 to 6 mentioned above, wherein the organic solvent B comprises glycerin.

8. The method according to any one of 1 to 7 mentioned above, wherein the ink further contains a silicone-based surfactant.

9. The printing method according to 8 mentioned above, wherein the silicone-based surfactant contains polyxyalkylene-modified dimethyl polysiloxane represented by the following Chemical Formula (1).

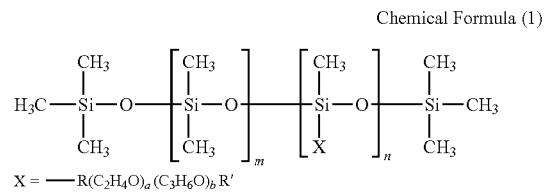

Chemical Formula (1)

In Chemical Formula (1), m represents 0 or an integer of from 1 to 10, n represent an integer of from 1 to 5, a represents 0 or an integer of from 1 to 20, b represents 0 or an integer of from 1 to 20, R represents an alkyl or alkylene group having 1 to 10 carbon atoms, and R' represents a hydrogen atom or an alkyl or alkylene group having 1 to 10 carbon atoms.

10. The printing method according to 9 mentioned above, wherein the silicone-based surfactant has a Hydrophilic-Lipophilic Balance (HLB) value of from 8.0 to 11.5 according to Griffin's method.

11. The printing method according to any one of 8 to 10 mentioned above, wherein the proportion of the silicone-based surfactant to the ink is from 0.5 to 1.5 percent by mass.

12. A printing device includes a container containing an ink, a discharging device for discharging the ink to a substrate, the discharging device including a nozzle having a discharging orifice at a nozzle surface, a first heating device for heating the non-ink-discharged side of the substrate at a temperature of T1, and a second heating device for heating the ink-discharged side of the substrate at a temperature of T2, wherein the following relationship (1) is satisfied: 0 degrees C.≤T2−T1 90 degrees C. Relationship (1), wherein the ink contains an organic solvent A having a boiling point of lower than 250 degrees C., an organic solvent B having a boiling point of 250 degrees C. or higher, and a resin, wherein the proportion of the organic solvent A to the ink is 30 percent by mass or less, wherein the proportion of the organic solvent B to the ink is from 1 to 3 percent by mass, wherein the proportion of the resin to the ink is from 5 to 15 percent by mass, wherein the ink has a viscosity of from 8.0 to 11.0 mPa·s at 25 degrees C. and from 5.5 to 11.0 mPa·s at 36 degrees C., wherein a droplet of the ink having a volume of 2.5 μL discharged to the substrate shrinks to 0.1 μL or less in 10.0 seconds or less at 25 degrees C.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:
1. A printing method comprising:
    discharging ink to a substrate;
    heating a non-ink-discharged side of the substrate at a temperature of T1; and
    heating an ink-discharged side of the substrate at a temperature of T2,
    wherein the following relationship (1) is satisfied:

$$0 \text{ degrees C.} \leq T2-T1 \leq 90 \text{ degrees C.} \qquad \text{Relationship (1),}$$

wherein the ink comprises:
        an organic solvent A having a boiling point of lower than 250 degrees C.;
        an organic solvent B having a boiling point of 250 degrees C. or higher; and
        a resin,
    wherein a proportion of the organic solvent A to the ink is 30 percent by mass or less,
    wherein a proportion of the organic solvent B to the ink is from 1 to 3 percent by mass,
    wherein a proportion of the resin to the ink is from 5 to 15 percent by mass,
    wherein the ink has a viscosity of from 8.0 to 11.0 mPa·s at 25 degrees C. and from 5.5 to 11.0 mPa·s at 36 degrees C.,
    wherein a droplet of the ink having a volume of 2.5 µL discharged to the substrate shrinks to 0.1 µL or less in 10.0 seconds or less at 25 degrees C.

2. The printing method according to claim 1, wherein T1 is from 20 to 70 degrees C.

3. The printing method according to claim 1, wherein, in the heating a non-ink-discharged side, the non-ink-discharged side is heated by at least one of a heated wind heater or an infra-red heater.

4. The printing method according to claim 1,
    wherein the resin contains resin particles comprising at least one type of resin particles having a glass transition temperature of 0 degrees C. or lower.

5. The printing method according to claim 4,
    wherein the resin particles comprise urethane resin particles.

6. The printing method according to claim 4,
    wherein a proportion of the resin particles to the resin is from 30 to 70 percent by mass.

7. The printing method according to claim 1,
    wherein the organic solvent B comprises glycerin.

8. The printing method according to claim 1, wherein the ink further comprises a silicone-based surfactant.

9. The printing method according to claim 8,
    wherein the silicone-based surfactant comprises polyxyalkylene-modified dimethyl polysiloxane represented by the following Chemical Formula (1), Chemical Formula (1)

$$H_3C-\underset{\underset{CH_3}{|}}{\overset{\overset{CH_3}{|}}{Si}}-O-\left[\underset{\underset{CH_3}{|}}{\overset{\overset{CH_3}{|}}{Si}}-O\right]_m-\left[\underset{\underset{X}{|}}{\overset{\overset{CH_3}{|}}{Si}}-O\right]_n-\underset{\underset{CH_3}{|}}{\overset{\overset{CH_3}{|}}{Si}}-CH_3$$

$$X = -R(C_2H_4O)_a(C_3H_6O)_bR'$$

where m represents 0 or an integer of from 1 to 10, n represent an integer of from 1 to 5, a represents 0 or an integer of from 1 to 20, b represents 0 or an integer of from 1 to 20, R represents an alkyl or alkylene group having 1 to 10 carbon atoms, and R' represents a hydrogen atom or an alkyl or alkylene group having 1 to 10 carbon atoms.

10. The printing method according to claim 9,
    wherein the silicone-based surfactant has a Hydrophilic-Lipophilic Balance value of from 8.0 to 11.5 according to Griffin's method.

11. The printing method according to claim 8,
    wherein a proportion of the silicone-based surfactant to the ink is from 0.5 to 1.5 percent by mass.

12. A printing device comprising:
    a container containing an ink;
    a discharging device configured to discharge the ink to a substrate, the discharging device comprising a nozzle having a discharging orifice at a nozzle surface;
    a first beating device configured to heat a non-ink-discharged side of the substrate at a temperature of T1; and
    a second beating device configured to heat an ink-discharged side of the substrate at a temperature of T2,
    wherein the following relationship (1) is satisfied:

$$0 \text{ degrees C.} \leq T2-T1 \leq 90 \text{ degrees C.} \qquad \text{Relationship (1)}$$

wherein the ink comprises:
        an organic solvent A having a boiling point of lower than 250 degrees C.;
        an organic solvent B having a boiling point of 250 degrees C. or higher; and
        a resin,
    wherein a proportion of the organic solvent A to the ink is 30 percent by mass or less,
    wherein a proportion of the organic solvent B to the ink is from 1 to 3 percent by mass,
    wherein a proportion of the resin to the ink is from 5 to 15 percent by mass, wherein the ink has a viscosity of from 8.0 to 11.0 mPa·s at 25 degrees C. and from 5.5 to 11.0 mPa·s at 36 degrees C.,
    wherein a droplet of the ink having a volume of 2.5 µL discharged to the substrate shrinks to 0.1 µL or less in 10.0 seconds or less at 25 degrees C.

* * * * *